US008234936B2

(12) United States Patent
Nakata et al.

(10) Patent No.: US 8,234,936 B2

(45) Date of Patent: Aug. 7, 2012

(54) TORQUE WRENCH HAVING IMPROVED TIGHTENING TORQUE MEASUREMENT VALUE

(75) Inventors: Shogo Nakata, Kyoto (JP); Tadashi Hanai, Yao (JP); Kouji Fujita, Yao (JP); Masahiko Umekawa, Yao (JP); Hiroshi Uchida, Yao (JP)

(73) Assignees: Hosiden Corporation, Yao-shi (JP); Kyoto Tool Co., Ltd., Kyoto-shi (JP)

( * ) Notice: Subject to any disclaimer, the term of this patent is extended or adjusted under 35 U.S.C. 154(b) by 0 days.

(21) Appl. No.: 12/599,387

(22) PCT Filed: May 28, 2008

(86) PCT No.: PCT/JP2008/059791

§ 371 (c)(1), (2), (4) Date: Nov. 9, 2009

(87) PCT Pub. No.: WO2008/152912

PCT Pub. Date: Dec. 18, 2008

(65) Prior Publication Data

US 2010/0206141 A1 Aug. 19, 2010

(30) Foreign Application Priority Data

Jun. 13, 2007 (JP) ................................ 2007-156700

(51) Int. Cl.
*G01L 5/24* (2006.01)
*B25B 23/159* (2006.01)

(52) U.S. Cl. ............... 73/862.26; 73/862.21; 73/862.23; 81/477; 81/478; 81/479

(58) Field of Classification Search .. 73/862.21–862.25, 73/862.191; 81/52–76, 467, 469, 478–483, 81/47

See application file for complete search history.

(56) References Cited

U.S. PATENT DOCUMENTS 4,006,629 A 2/1977 Barrett et al. .................. 73/139

(Continued)

FOREIGN PATENT DOCUMENTS

DE 31 39 374 A1 4/1983

(Continued)

OTHER PUBLICATIONS

Extended European Search Report issued on Sep. 2, 2010 for the counterpart European patent application No. 08764807.7.

(Continued)

*Primary Examiner* — Lisa Caputo
*Assistant Examiner* — Jonathan Dunlap
(74) *Attorney, Agent, or Firm* — Kratz, Quintos & Hanson, LLP

(57) ABSTRACT

A torque wrench having ease of operation compatible with improved accuracy of measurement. The torque wrench includes a tightening portion, a housing having a front side cover part and a back side grip part and a shaft-like strain body that is contained inside the housing. First distortion sensors and second distortion sensors are arranged on the strain body at spaced points in the axial direction of the strain body for measuring an amount of distortion of the strain body. A microprocessor chip has functions including computation of a tightening torque which is corrected for errors due to changes in a point of effort where a tightening force is applied by a user. The correction is based on the detection result of the first distortion sensors and the second distortion sensors. An output portion outputs the corrected tightening torque measurement value.

6 Claims, 7 Drawing Sheets

(a)

(b)

U.S. PATENT DOCUMENTS

| | | | | |
|---|---|---|---|---|
| 4,958,541 | A * | 9/1990 | Annis et al. | 81/479 |
| 4,976,133 | A | 12/1990 | Pohl | |
| 4,982,612 | A | 1/1991 | Rittmann | |
| 6,694,829 | B2 * | 2/2004 | Chimura et al. | 73/862.627 |
| 7,469,619 | B2 * | 12/2008 | Anjanappa et al. | 81/479 |
| 7,832,286 | B2 * | 11/2010 | Nakagawa et al. | 73/862.22 |
| 2006/0225519 | A1 | 10/2006 | Nakagawa | |
| 2007/0119267 | A1 * | 5/2007 | Anjanappa et al. | 73/862.21 |
| 2010/0206141 | A1 * | 8/2010 | Nakata et al. | 81/479 |

FOREIGN PATENT DOCUMENTS

| | | | |
|---|---|---|---|
| DE | 93 12 988.2 | U1 | 1/1994 |
| EP | 0 362 696 | A1 | 4/1990 |
| EP | 1 710 051 | A2 | 10/2006 |
| FR | 2 538 741 | A1 | 7/1984 |
| FR | 2 841 650 | | 1/2004 |
| JP | 2-262968 | | 10/1990 |
| JP | 8-136367 | | 5/1996 |
| JP | 08136367 | A * | 5/1996 |
| JP | 2006-289535 | A1 | 10/2006 |

OTHER PUBLICATIONS

International Search Report for International Application No. PCT/JP2008/059791 dated Jun. 19, 2008.

* cited by examiner (a)

(b)

TORQUE WRENCH HAVING IMPROVED TIGHTENING TORQUE MEASUREMENT VALUE

TECHNICAL FIELD

The present invention relates to torque wrenches that uses distortion sensors to measure tightening torques of tightening tools such as ratchet wrenches.

BACKGROUND ART

A conventional torque wrench of this type has a tightening unit such as a ratchet wrench, a housing with a separable two-piece structure comprising a front side cover part and a back side grip part, a strain body that is provided inside the housing and is coupled with the replaceable tightening unit, distortion sensors that detect distortion amount of the strain body, a microprocessor chip having functions including computation of a tightening torque based on the detection result of the distortion sensors, and an output unit that outputs the tightening torque, etc. (See Patent Literature 1).

Patent Literature 1: JP 2006-289535 A

SUMMARY OF INVENTION

Technical Problem

Unfortunately, if a user grips the conventional wrench for operation at a position off a predetermined grip position, the wrench issues an alert and makes the user to start over the operation, which may annoy the user. Meanwhile, if the wrench had a wide range of allowance as to whether or not to issue alarms, warning alarms would be raised less frequently but the measurement accuracy would degrade significantly.

The present invention was made in view of the foregoing circumstances. It is an object of the invention to provide a torque wrench that provides ease of operation and high measurement accuracy at the same time.

Solution to Problem

A torque wrench according to the present invention includes: a shaft-like strain body having a leading end coupled with a replaceable tightening portion; a housing for containing the strain body; first and second distortion sensors for measuring a tightening torque, the first and second distortion sensors being arranged at different points in an axial direction of the strain body; a torque computation section for performing a computation of the tightening torque while correcting an error due to a change in a point of effort, at least based on measurement results of the first and second distortion sensors; and an output portion for outputting at least a result of the computation performed in the torque computation section as a tightening torque measurement value.

Such a torque wrench has first and second distortion sensors arranged at different positions in the axial direction of the strain body and is configured to compute and output a tightening torque while correcting a measurement error caused by a change in the point of effort, based on measurement results of the first and second sensors. The torque wrench, unlike the conventional one, can thus provide accurate measurement results irrespective of the grip position during the operation of the torque wrench. That is, the invention can achieve ease of operation compatible with improved accuracy of measurement.

The housing may be of a front side cover part in a tubular shape adapted to receive the leading end of the strain body, a leading endface of the front side cover part being provided with a hole for receiving a proximal end of the tightening portion; and a back side grip part in a tubular shape adapted to receive a proximal end of the strain body, the back side grip part being provided therein with a shaft extending in a direction orthogonal to tightening force. The shaft may pass through side faces of the strain body, and a rear end of the strain body may be fixed to the back side grip part.

The torque wrench may additionally have a setting portion for setting a tightening torque set value; and a torque determination section for making a determination whether or not the torque measurement value indicated by the result of the computation by the torque computation section is close to or has attained the tightening torque set value that is set via the setting portion, the torque determination section being adapted to order the output portion to output a result of the determination.

In this case, an alert is given when the tightening torque measured is close to or has attained the tightening torque set value that has been set in advance, so that tightening operation can be carried out smoothly.

It is preferable that a sensor unit be attached to a surface of the strain body, the sensor unit being configured such that the first and second distortion sensors are formed on a flexible circuit board. In this case, the surface of the strain body may preferably be formed with a recess having a length dimension corresponding to the sensor unit, and that the sensor unit is affixed to the recess.

In these cases where the sensor unit configured such that the first and second distortion sensors are formed on a flexible circuit board is attached on the surface of the strain body, the first and second sensors can be attached easily to the strain body and can also be disposed highly accurately with respect to the strain body, contributing to facilitation of assembly and reduction in cost.

Best Mode For Carrying Out The Invention

An embodiment of the present invention is described below with reference to FIGS. 1 to 7. FIG. 1 is a front view and a side view, respectively, of a torque wrench; FIG. 2 is a cross-sectional view of a portion taken along line A-A of FIG. 1; FIG. 3 is a cross-sectional view of a portion taken along line B-B of FIG. 1; FIG. 4 is an exploded perspective view of the torque wrench; FIG. 5 schematically illustrates left and right side views, respectively, of a strain body of the torque wrench, with sensor units attached to the strain body; FIG. 6 is an electrical configuration diagram of the torque wrench, and FIG. 7 is an illustration for explaining a computing equation used in a torque computation section of the torque wrench.

The torque wrench exemplified herein includes: a tightening portion 10 such as a ratchet wrench; a housing 20 having a front side cover part 21 and a back side grip part 22; a shaft-like strain body 30 that is contained in the housing 20 and has a leading end coupled with the replaceable tightening portion 10; first distortion sensors 42*a* and 42*b* and second distortion sensors 43*a* and 43*b* that are disposed at different positions in the axial direction of the strain body 30 for measuring a tightening torque T; a setting portion 70 for setting a tightening torque set value, etc.; a microprocessor chip 100 having functions including computation of the tightening torque T while correcting errors caused by changes in the point of effort, based on the detection result of the first distortion sensors 42*a* and 42*b* and the second distortion sensors 43*a* and 43*b*; and an output portion 300 that outputs the tightening torque T, etc.

First, a mechanical structure of the torque wrench is described below referring to FIGS. 1 to 3. As shown in FIG. 1, the tightening portion 10 is rotated in a direction Q by a tightening force F applied on a back side grip part 22 of the housing 20. The tightening force F is applied in directions R, which are orthogonal to the rotation axis direction P of the tightening portion 10.

The tightening portion 10 is a shaft-like member and is provided at its leading end with a tightening tool facing in the direction P. The tightening tool may be a ratchet wrench, an open-end wrench, an adjustable end wrench and any other types of wrenches. In the illustrated example, a ratchet wrench is shown as the tightening tool of the tightening portion 10.

The housing 20 is molded of plastic and is of a separable two-piece structure comprising the front side cover part 21 and the back side grip part 22. The front side cover part 21 and the back side grip part 22 are tubular assemblies. The front side cover part 21 contains a leading end 31 and an intermediate portion 32 of the strain body 30, whilst the back side grip part 22 contains a proximal end 33 of the strain body 30 with a clearance therebetween.

A hole 211 is formed in a leading endface of the front side cover part 21 to receive a proximal end of the tightening portion 10. In a rear surface of the front side cover part 21, there is formed a hole 212 to receive an attachment screw 60 in the direction P so as to fix the tightening portion 10 to the strain body 30 with the screw 60.

The front surface of the front side cover part 21 is provided with a liquid crystal display (LCD) 310, below which a main circuit board 200 is disposed. The main circuit board 200 is provided with the microprocessor chip 100 and its peripheral circuit, a light emitting diode (LED) 330, and the setting portion 70. The setting portion 70 has four press switches, with the heads of key tops 71 thereof exposed from the front surface of the front side cover part 21. A buzzer 320 and a battery 90 are provided below the main circuit board 200. FIG. 4 also illustrates a battery lid 24 and a nut 241 used for attaching the battery lid.

Within the back side grip part 22 is a shaft 50, which is a boss oriented in the direction P. Inner walls of the back side grip part 22 have a pair of holes 221 facing each other. The holes 221 receive and support the opposite ends of the shaft 50.

A grip cap 23 molded of plastic is generally shaped as a disk to be rotatably attached to the rear end of the back side grip part 22. A tubular body is formed inside of the grip cap 23, and the inside of the tubular body forms a hole 231.

The strain body 30 is a resilient metallic body of elongated cylindrical shape having a length slightly shorter than the housing 20 to be contained inside the housing 20. The strain body 30 is structured to have the leading end 31 and the intermediate portion 32 located inside the front side cover part 21, the proximal end 33 located inside the back side grip part 22, and a rear end 34 located inside the grip cap 23. The rear end 34 of the strain body 30 forms a shaft with a diameter smaller than those of the leading end 31, the intermediate portion 32, and the proximal end 33.

In the present embodiment, the strain body 30 is formed cylindrically in view of workability and cost, but it may be of a prismatic or columnar shape. It is most preferable to form the strain body 30 in a prismatic shape because the strain body 30 is axially supported by the shaft 50 and its resilience works in a constant direction.

The leading end 31 of the strain body 30 has a hole 311 extending longitudinally to receive the proximal end of the tightening portion 10. The leading end 31 has screw holes 312 passing through their front and back faces in the direction P. The screw 60 is threadedly attached into the screw holes 312, so that tightening portion 10 is replaceably coupled to the leading end 31 of the strain body 30.

The intermediate portion 32 of the strain body 30 has recesses 321 in opposite lateral faces thereof in the directions R. A sensor unit 40*a* including the first distortion sensor 42*a* and the second distortion sensor 43*a* is fixedly attached into one of the recesses 321, whereas a sensor unit 40*b* including the first distortion sensor 42*b* and the second distortion sensor 43*b* is fixedly attached into the other recess 321.

The proximal end 33 of the strain body 30 has a hole 331 to receive the shaft 50. In other words, the shaft 50 penetrates side faces of the strain body 30.

The rear end 34 of the strain body 30 is inserted into the hole 231 in the grip cap 23. In other words, the rear end of the strain body is fixed to the back side grip part 22 by means of the grip cap 23.

The sensor unit 40*a* is structured to have a rectangular flexible circuit board 41*a* of a length corresponding to the longitudinal length of the associated recess 321 in the strain body 30, the first distortion sensor 42*a* fabricated on a side of a top surface of the flexible circuit board 41*a*, the second distortion sensor 43*a* fabricated on the other side of the top surface of the flexible circuit board 41*a*, and electrodes 44*a* fabricated between the first and second sensors on the top surface of the flexible circuit board 41*a*.

The sensor unit 40*a* structured as above is adhesively bonded to the bottom of the recess 321 in the strain body 30, such that the first distortion sensor 42*a* and the second distortion sensor 43*a* are aligned in the axial direction on the strain body 30.

The sensor unit 40*b* has the same structure as that of the above sensor unit 40*a*, and the detailed description thereof will not be given here.

Next, an electrical configuration of the torque wrench is described with reference to FIGS. 5 and 6.

In the present embodiment, the first distortion sensors 42*a* and 42*b* and the second distortion sensors 43*a* and 43*b* use strain gauges, in which electrical resistances change linearly in accordance with the amount of distortion of the strain body 30.

The first distortion sensors 42*a* and 42*b* output signals to the microprocessor chip 100 via an amplification circuit 201 and subsequently via an analog-to-digital converter (ADC) 202. The amplification circuit 201, such as a bridge circuit, amplifies differential signals between the output signals from the sensors 42*a* and 42*b*, and the ADC 202 converts analogue signals to digital signals. The same operation takes place regarding the second distortion sensors 43*a* and 43*b*, which output signals to the microcomputer 100 via an amplification circuit 203 and subsequently via an ADC 204. The amplification circuit 203, such as a bridge circuit, amplifies differential signals between the output signals from the sensors 43*a* and 43*b*, and the ADC 204 converts analogue signals to digital signals.

The setting portion 70 receives input about selection of data in memory, a tightening torque set value, and power-on/off, and outputs such data input to the microprocessor chip 100.

The output portion 300 of the embodiment includes the liquid crystal panel (LCD) 310 for displaying a measured tightening torque T, etc. The output portion 300 also includes the buzzer 320 and the LED 330 for informing the user of the status conditions, namely, when the power is turned on or off, when the wrench is ready to start measurement, when a tightening torque T has reached 90% of the tightening torque set value or exceeds the tightening torque set value.

A memory portion 80 used in the embodiment prestores various reference values required for computing a tightening torque T and is interconnected with a bus line of the microprocessor chip 100. The memory portion 80 of the embodiment is an EEPROM, or a non-volatile memory.

The battery 90 supplies a power supply voltage to the microprocessor chip 100, peripheral circuits thereof, and the output portion 300, etc. A lithium-manganese dioxide cell is used for the battery of the embodiment.

In the present embodiment, the microprocessor chip 100 is connected at its input ports with the ADC 202, the ADC 204, and the setting portion 70, etc., whereas at its output ports with the output portion 300, etc. The microprocessor chip 100 stores software in its internal memory to be processed sequentially to provide functions as a torque computation section 110 and a torque determination section 120 (to be described below).

The torque computation section 110 computes a tightening torque T according to Equation 1 below and based on various reference values (l1, l2, L, ka, kb, na, nb) in the memory portion 80, output values of the ADC 202 (ADamax, ADamin, ADa), and output values of the ADC204 (ADbmax, ADbmin, ADb).

operation with the setting portion 70. In the case where a unit of torque other than N·m is set through the setting portion 70, it is possible to output a converted value of the tightening torque T into the set unit, along with the indication of that unit, to the LCD 310.

The torque determination section 120 determines whether or not the tightening torque T obtained from computation in the torque computation section 110 has attained 90% of the tightening torque set value that was set through the setting portion 70 and determines whether or not the obtained tightening torque T has exceeded the tightening torque set value. The torque determination section 120 then output the determination results by means of the buzzer 320 and the LED 330. This is how the microprocessor chip 100 functions as the torque determination section 120.

In addition to the above functions, the microprocessor chip 100 has various functions including a memory function of storing in its internal memory the tightening torque set value set by means of the setting portion 70, and a sleep mode in which power consumption is reduced to a low level when the output values from the ADCs 202 and 204 remain for a predetermined period of time.

Equation 1

$$T = \frac{40}{(l_2 - l_1)\cdot(AD_{amax} - AD_{amin})\cdot(AD_{bmax} - AD_{bmin})}\cdot\{\{l_1\cdot(k_a\cdot(AD_a - AD_{amin}) + n_a(AD_{amax} - AD_{amin}))\cdot(l_2 - L)\cdot(AD_{bmax} - AD_{bmin}) + l_2\cdot(k_b\cdot(AD_b - AD_{bmin}) + n_b(AD_{bmax} - AD_{bmin}))\cdot(L - l_1)\cdot(AD_{amax} - AD_{amin})\}\}$$

Where

11: the distance from the first distortion sensors 42_a_ and 42_b_ to the shaft 50 in FIG. 7

12: the distance from the second distortion sensors 43_a_ and 43_b_ to the shaft 50 in FIG. 7

L: the effective length, i.e., the distance between the rotary torque P and the tightening force F in FIG. 1 ka: a coefficient of the moment conversion equation, to be used for the pair of first distortion sensors 42_a_ and 42_b_ in FIG. 7 kb: a coefficient of the moment conversion equation, to be used for the pair of second distortion sensors 43_a_ and 43_b_ in FIG. 7 na: a coefficient of the moment conversion equation, to be used for the pair of first distortion sensors 42_a_ and 42_b_ in FIG. 7 nb: a coefficient of the moment conversion equation, to be used for the pair of second distortion sensors 43_a_ and 43_b_ in FIG. 7

ADamax: the maximum output value of the ADC 202 in FIG. 6

ADamin: the minimum output value of the ADC 202 in FIG. 6

ADbmax: the maximum output value of the ADC 204 in FIG. 6

ADbmin: the minimum output value of the ADC 204 in FIG. 6

ADa: the output value of the ADC 202 in FIG. 6

ADb: the output value of the ADC 204 in FIG. 6

The above described is a basic function of the microprocessor chip 100 as the torque computation section 110. In the present embodiment, instantaneous values of the tightening torque T are computed in the above manner and outputted to the LCD 310. The instantaneous values outputted to the LCD 310 may be retained but may be released through switching A description is given below of how to use the torque wrench structured as above and how the torque wrench operates.

First, when turning on the torque wrench using the setting portion 70, the microprocessor chip 100, etc. are fed with source voltage and become operational. The microprocessor chip 100 reads various reference values in the memory portion 80 that are required for setting, so as to process initial setting including zero point control.

In this state, a tightening torque set value, a torque unit and/or other values can be set and inputted by means of the setting portion 70. Then, the microprocessor chip 100 retains the inputted data in the internal memory. If the output values from the ADCs 202 and 204 do not change for a predetermined period of time, the microprocessor chip 100 turns into a sleep mode in which power consumption is reduced to a low level.

To actually fasten a bolt or the like using the torque wrench, the tightening portion 10 is rotated in the direction Q with the back side grip part 22 held in a hand. In doing this, there is no given position for gripping, and normal torque measurement is effected whichever portion of the back side grip part 22 is held to carry out the tightening operation.

Originally, if tightening operation is made by gripping a portion right above the shaft 50 of the back side grip part 22 (hereinafter referred to as an "original grip position"), a force P1 shown in FIG. 7 is the greatest while a force P2 is almost zero in magnitude. Thus, when a constant load is applied on the original grip position, a proportional relationship is exhibited between the output of the first distortion sensors 42_a_ and 42_b_ and the force P1. If the same load is applied with a point of effort shifted from the original grip position toward the output portion 300, the force P2 has a load in the opposite direction from the direction of the force P1. Similarly, if the point of effort is shifted from the original grip position toward the grip cap 23, the force P1 decreases, and the force P2 increases in the same direction as the direction of the force P1. At this time, the proportional relationship between the output of the first distortion sensors 42*a* and 42*b* and the force P1 is broken. In accordance with this change of relationship, outputs of the second distortion sensors 43*a* and 43*b* are calculated to determine the values of the forces P1 and P2.

For example, in the case where the point of effort is shifted from the original grip position toward the grip cap 23, the output of the sensors becomes equal to the total value of the force P1 and the force P2, where the outputs of the first distortion sensors 42*a* and 42*b* and of the second distortion sensors 43*a* and 43*b* both increase. Torque is computed based on the relationship among the output signals, the sensor positions, and the point of effort. Accurate torque computation is thereby possible whatever force is applied in gripping. In other words, tightening torque T can be determined correcting errors due to changes in the point of effort.

As described above, the torque wrench is adapted to implement normal torque measurement with whichever portion of the back side grip part 22 gripped to carry out tightening. The torque wrench thus enjoys remarkably improved operability, and unskilled users can perform tightening operation adequately.

Further, the buzzer 320 and the LED 330 serve as means to signal that the tightening torque T has attained 90% of the tightening torque set value in the internal memory. After that, if the tightening torque T exceeds the tightening torque set value in the internal memory, the buzzer 320 and the LED 330 signals as such. In this way, a user receives a warning by means of the sound of the buzzer 320 and the illumination of the LED 330. The user can tighten a bolt or the like while checking the warning, so that he can carry out the tightening operation smoothly.

In the case where the tightening tool needs to be changed to another type, the tightening portion 10 can be replaced removing the attachment screw 60. If the effective length is the same after the replacement, a tightening torque T can be measured in exactly the same manner as described above.

If the effective length has changed after the replacement, the data of the various reference values in the memory portion 80 should be rewritten to obtain accurate measurement results for the tightening torque T.

More specifically, the torque wrench is applicable to tightening operation using not only a ratchet wrench but also an adjustable end wrench, an open-end wrench and other types of tools, and these tools may have different effective lengths. The torque wrench is thus adapted to measure a wide range of tightening torque T. Moreover, the tightening force F acts only on the shaft 50 and the rear end 34 in the strain body 30, the entire strain body 30 desirably makes a large amount of distortion, resulting in improved accuracy in measurement of the tightening torque.

The torque wrench of the present invention is not limited to the foregoing embodiment and may be modified in design as described below. The tightening portion 10 may be a tool of any shape and/or any type, and may be coupled to the strain body 30 in any manner. For example, the tightening portion 10 may be coupled to the leading end 31 of the strain body 30 by means of the front side cover part 21. The strain body 30 only needs to be shaped like a shaft, and it may be of any material, of any cross-sectional shape and of any configuration. Its leading end 31 may be exposed. The first distortion sensors 42*a* and 42*b* and the second distortion sensors 43*a* and 43*b* may be of any kind. These sensors may be attached in any manner and at any positions insofar as first distortion sensors 42*a* and 42*b* and the second distortion sensors 43*a* and 43*b* are disposed at different positions in the axial direction of the strain body. For example, a first sensor and a second sensor may be attached directly onto a surface or surfaces of the strain body 30; a first sensor and a second sensor may be disposed not at aligned positions in the axial direction but at shifted positions from each other in the circumferential direction.

The torque computation section 110 and the torque determination section 120 may use an analogue circuit or other means to implement functions identical or similar to the above described ones. Especially, the torque computation section 110 may be configured such that the memory portion 80 prestores a plurality of sets of various reference values, each set corresponding to each effective length, while allowing the type of the tightening portion 10 to be selected and inputted by means of the setting portion 70, so that the selected type of the tightening portion 10 can be inputted to retrieve the corresponding set of reference values from the memory portion 80 and to compute a tightening torque T using the reference values.

The output portion 300 may output torque measurement values and determination results in any format and manner. For example, it may be adapted to simply notify determination results by light, sound, vibration, etc., as to whether a torque measurement value is close to or has attained a torque set value. The housing 20 may be made of any material if resistant to anticipated impact; it may be of any shape and may be configured to simply hold the proximal end 33 of the strain body 30 inside the back side grip part 22.

REFERENCE SIGNS LIST

Figure 1:
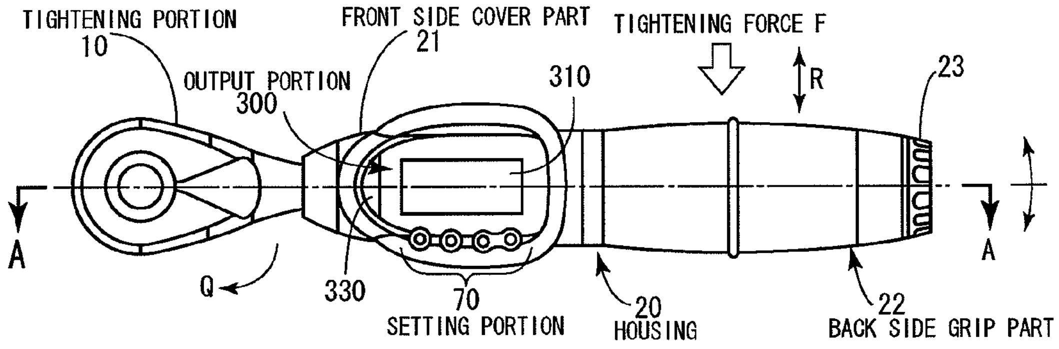
FIG. 1 illustrates an embodiment of the present invention, where FIG. 1(*a*) is a front view of a torque wrench and FIG. 1(*b*) is a side view thereof.
Figure 1:
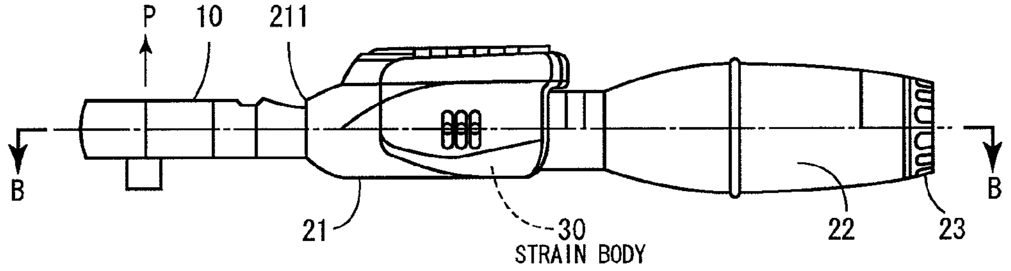
Figure 2:
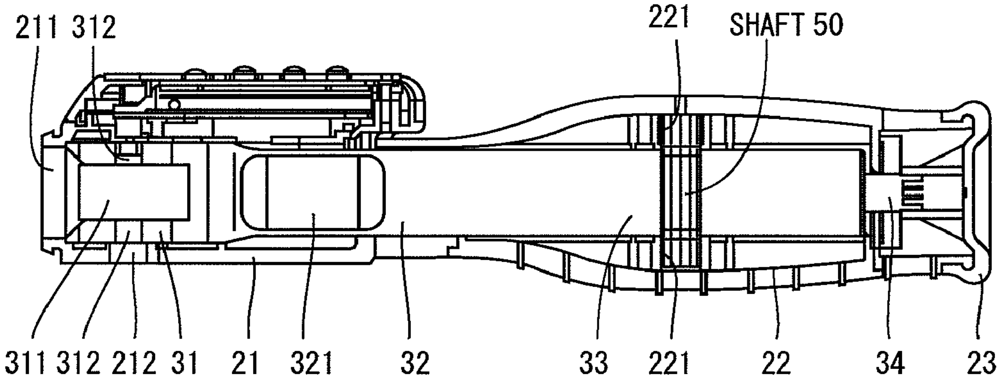
FIG. 2 is a cross-sectional view of a portion taken along line A-A of FIG. 1(*a*).
Figure 3:
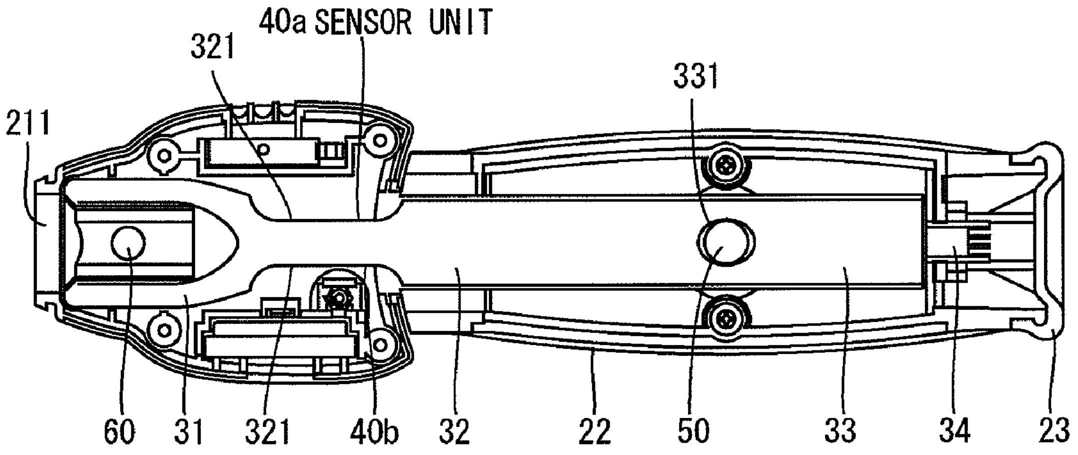
FIG. 3 is a cross-sectional view of a portion taken along line B-B of FIG. 1(*b*).
Figure 4:
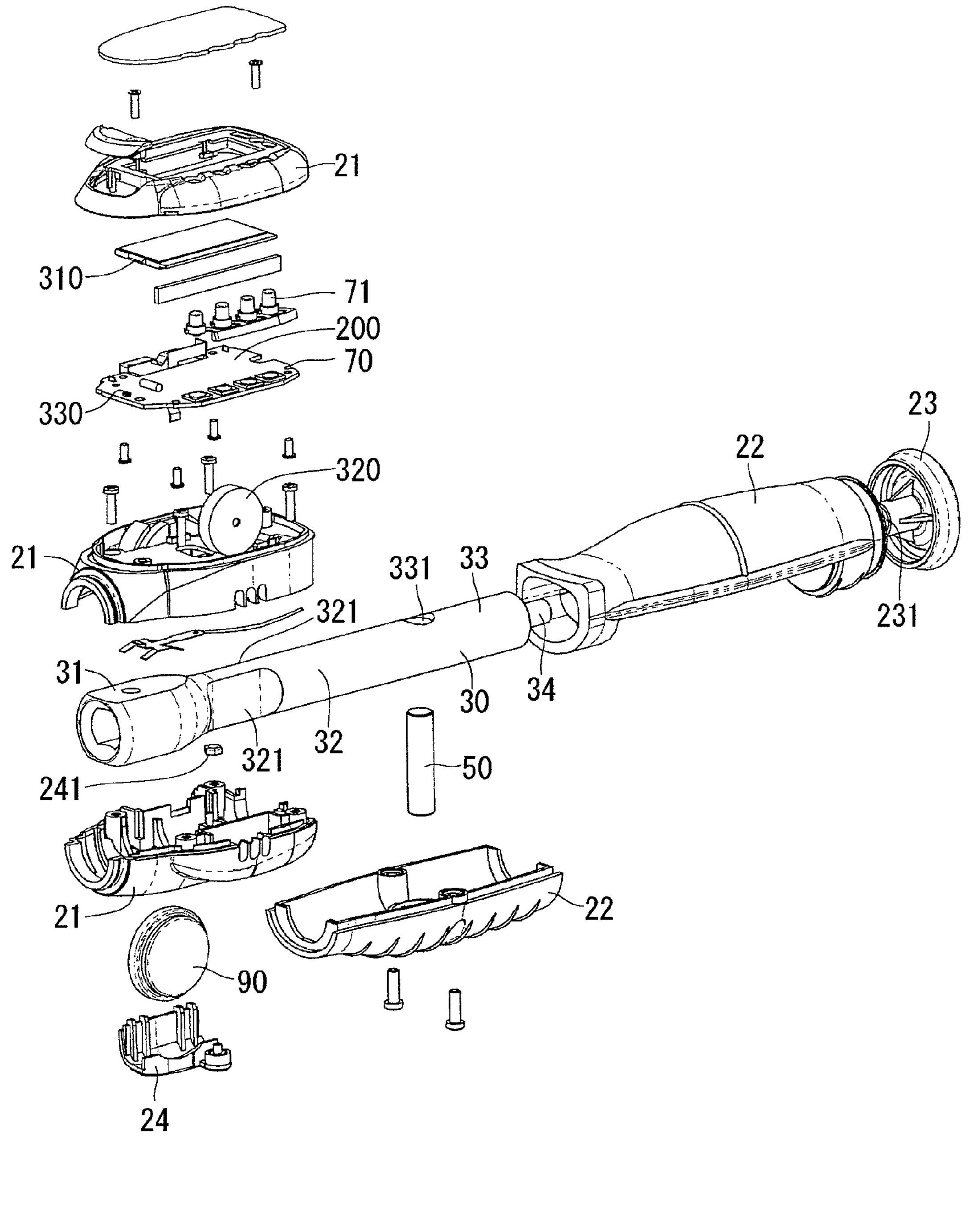
FIG. 4 is an exploded perspective view of the torque wrench.
Figure 5:
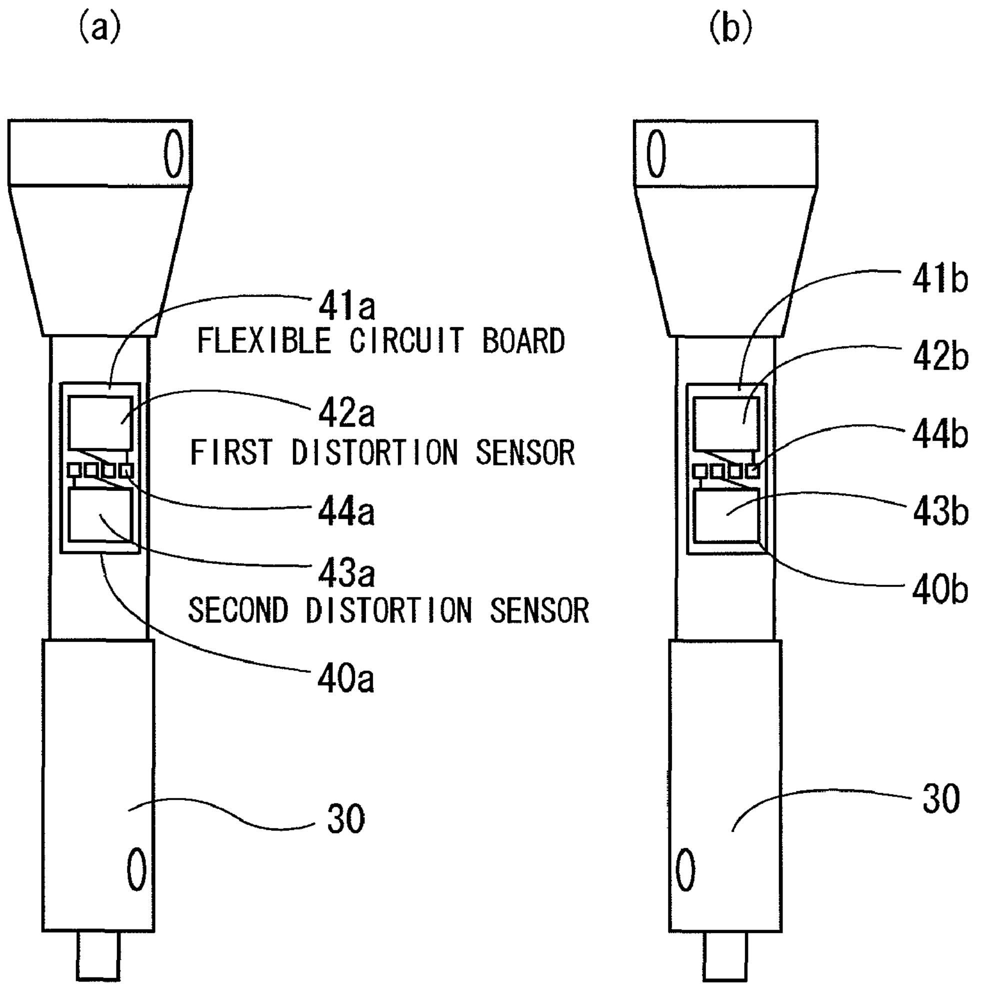
FIG. 5 schematically illustrates a strain body of the torque wrench with sensor units attached thereto, where FIG. 5(*a*) is a left side view and FIG. 5(*b*) is a right side view.
Figure 6:
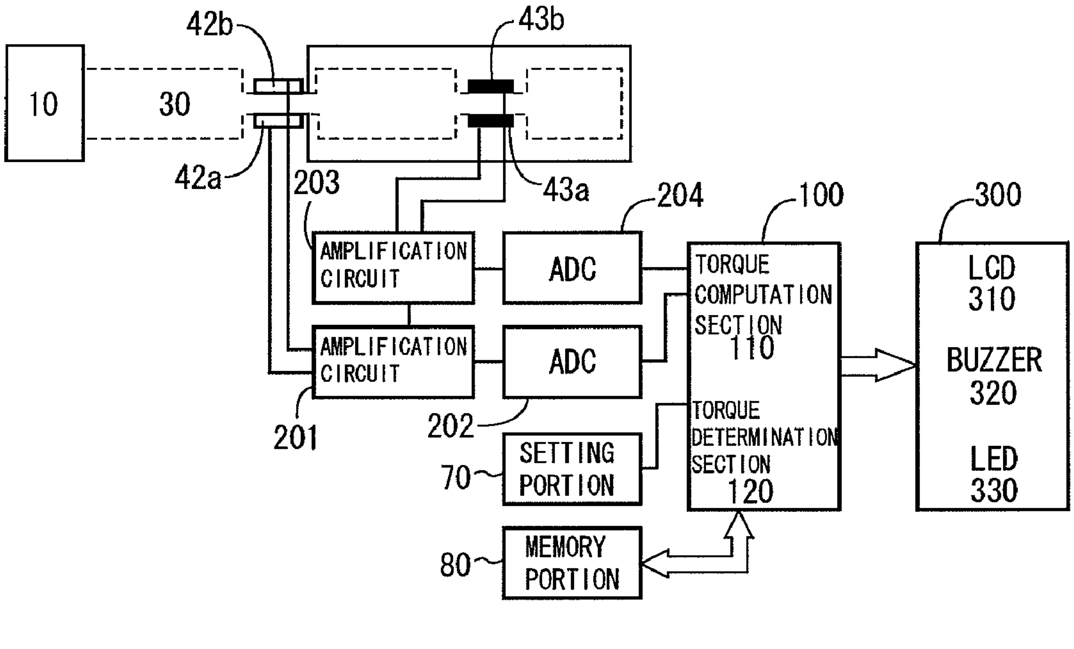
FIG. 6 is an electrical configuration diagram of the torque wrench.
Figure 7:
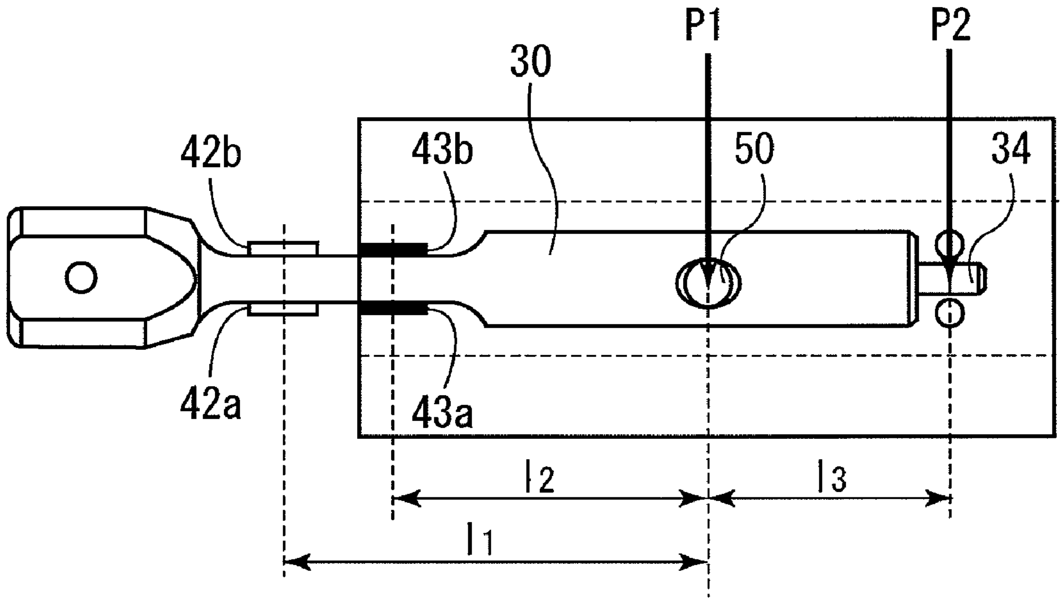
FIG. 7 is an illustration for explaining a computing equation used in a torque computation section of the torque wrench.

10 tightening portion
20 housing
  21 front side cover part
  22 back side grip part
  23 grip cap
30 strain body
40 sensor unit
  41*a*, 41*b* flexible circuit board
  42*a*, 42*b* first distortion sensor
  43*a*, 43*b* second distortion sensor
50 shaft
70 setting portion
80 memory portion
100 microprocessor chip
  110 torque computation section
  120 torque determination section
300 output portion

The invention claimed is:

1. A torque wrench comprising:

a shaft-like strain body having a leading end coupled with a replaceable tightening portion;

pairs of first and second distortion sensors for measuring an amount of distortion of the strain body, one of the first distortion sensors and one of the second distortion sensors being arranged on one of opposite sides in a tightening force application direction of the strain body, at spaced points in an axial direction of the strain body, the other first distortion sensor and the other second distortion sensor being arranged on the other side in the tightening force application direction of the strain body, at spaced points in the axial direction of the strain body;

a housing comprising:

a front side cover part in a tubular shape adapted to receive the leading end of the strain body, a leading endface of the front side cover part being provided with a hole for receiving a proximal end of the tightening portion; and a back side grip part in a tubular shape adapted to receive a proximal end of the strain body, the back side grip part being provided therein with a shaft extending in a direction orthogonal to the tightening force application direction and through the strain body;

a torque computation section for performing a computation of a tightening torque T while correcting an error due to a change in a point on the housing where a tightening force is applied by a user of the torque wrench, at least based on measurement results of the first and second distortion sensors; and an output portion for outputting at least a result of the computation performed in the torque computation section as a tightening torque measurement value, wherein a rear end of the strain body is fixed to the back side grip part to prevent movement of the rear end of the strain body in the tightening force application direction.

2. The torque wrench according to claim 1, further comprising:

a first amplification circuit to amplify differential signals outputted from the pair of first distortion sensors;

a second amplification circuit to amplify differential signals outputted from the pair of second distortion sensors;

a first analog-to-digital converter connected downstream of the first amplification circuit; and a second analog-to-digital converter connected downstream of the second amplification circuit, wherein the housing further comprises a grip cap provided on a rear end side of the back side grip part, a positioning fixing hole for receiving the rear end of the strain body is formed centrally in an inner face of the grip cap, and the torque computation section performs the computation of the tightening torque using a following equation:

$$T=k_1[(AD_{amax}-AD_{amin})\cdot(AD_{bmax}-AD_{bmin})]^{-1}\cdot[k_2(k_3(AD_a-AD_{amin})+k_4(AD_{amax}-AD_{amin}))\cdot k_5(AD_{bmax}-AD_{bmin}))+k_6(k_7(AD_b-AD_{bmin})+k_8(AD_{bmax}-AD_{bmin}))\cdot k_9(AD_{amax}-AD_{amin})]$$

where $k_1$ to $k_9$ are constants; $AD_a$, $AD_{amax}$, and $AD_{amin}$ are an output value, a maximum output value and a minimum output value, respectively, of the first analog-to-digital converter; and $AD_b$, $AD_{bmax}$, and $AD_{bmin}$ are an output value, a maximum output value and a minimum output value, respectively, of the second analog-to-digital converter.

3. The torque wrench according to claim 1, further comprising:

a setting portion for setting a tightening torque set value; and a torque determination section for making a determination whether or not the torque measurement value indicated by the result of the computation by the torque computation section is close to or has attained the tightening torque set value that is set via the setting portion, the torque determination section being adapted to order the output portion to output a result of the determination.

4. The torque wrench according to claim 1, further comprising a pair of sensor units attached on the opposite sides in the tightening force application direction of the strain body, the sensor units each including:

a flexible circuit board; and one of the first distortion sensors and one of the second distortion sensors formed on the flexible circuit board.

5. The torque wrench according to claim 4, wherein the strain body is formed with recesses each having a length dimension corresponding to each of the sensor units, and the sensor units are affixed to the recesses.

6. The torque wrench according to claim 1, wherein the back side grip part includes means for fixing the rear end of the strain body thereto and preventing the movement of the rear end of the strain body in the tightening force application direction.

* * * * *